Patented Jan. 25, 1949

2,459,995

UNITED STATES PATENT OFFICE 2,459,995

PROCESS OF PRODUCING HYDROCARBON OIL CONCENTRATES OF METAL SULFONATES

Gordon W. Duncan, Westfield, and John C. Zimmer, Union, N. J., assignors to Standard Oil Development Company, a corporation of Delaware No Drawing. Application February 5, 1946, Serial No. 645,715

12 Claims. (Cl. 260—504)

1

The present invention relates to lubricants and other petroleum products and more specifically to an improved method for the manufacture of additive compounds useful in rust preventive compositions, detergent engine oils, and other compositions using petroleum fractions as a base.

It is known that polyvalent metal sulfonates, particularly calcium and barium sulfonates, are useful as additives in many industrial petroleum oil products. Preferentially oil-soluble sulfonic acids are readily available from petroleum oils which have been heavily treated with sulfuric acid. The usual way employed to remove sulfonic acid from acid-treated oil is by neutralization with caustic to form alkali metal soaps which are extracted from the oil by a solvent such as aqueous alcohol. After removing the solvent by distillation, leaving an oil solution of the alkali metal sulfonate containing considerable water and inorganic salts, the soaps must again be dissolved in solvent (usually a more concentrated alcohol), for the purpose of settling out the inorganic salts in the form of brine which is discarded. The solvent is again removed by distillation, leaving a concentrate consisting of 20-70% of alkali metal soaps dissolved in the oil. Where oil-soluble polyvalent metal sulfonates are desired, the alkali metal sulfonates are converted to the polyvalent metal sulfonates by double decomposition of the alkali metal sulfonate with a salt of the selected polyvalent metal in aqueous solution. After formation of the polyvalent metal sulfonate it is a difficult and laborious task to remove the inorganic salts and other reaction products resulting as by-products from the double decomposition reaction. Alternatively, the oil-soluble polyvalent metal sulfonates can be made directly from the acid oil (containing 2-20% sulfonic acids) by neutralizing the sulfonic acid in the acid oil with the desired polyvalent metal or its oxide, hydroxide, or salt of a weak acid. This latter procedure entails concentration of the sulfonate by distillation of a portion of the diluent oil or extraction with a solvent such as phenol, cresol, furfurol, or the like, which requires elaborate equipment.

The principal object of the present invention is an improved method for the production of oil-soluble polyvalent metal sulfonates. This and other objects will be apparent to those skilled in the art upon reading the following description.

According to the present invention a process

2 has been discovered by means of which oil-soluble polyvalent metal sulfonate concentrates can be prepared in a rapid and efficient manner. The herein-described process is applicable to the conversion of oil-soluble alkali metal sulfonates, as produced in the prior art, to polyvalent metal sulfonates, as well as to the conversion of sulfonic acids (for examples, those found in acid treated petroleum oil fractions) to polyvalent metal sulfonates and recovering the sulfonates thus formed in concentrated form. The purposes of the present invention are attained by converting the preferentially oil-soluble sulfonic acids or their oil-soluble salts to an oil-insoluble form, removing a greater proportion of the oil, reconverting the oil-insoluble sulfonates to the oil-soluble form and filtering to remove insoluble by-products of the reaction.

The oil-soluble sulfonic acids may be synthetically derived by sulfonating olefins, aliphatic fatty alcohols, or their esters, alkylated aromatics or their hydroxy derivatives, partially hydrogenated aromatics, etc., with sulfuric acid or other sulfonating agents. However, the sulfonic acids which are usually produced during the treatment of lubricating oil distillates with concentrated sulfuric acid (85% or higher concentration) and remain in the oil after settling out sludge, are the most abundant and provide the preferred source of sulfonic acids. These sulfonic acids may be represented as

where (R) is one or more alkyl, alkaryl or aralkyl groups and the aromatic nucleus may be a single or condensed ring or a partially hydrogenated ring. The lower molecular weight sulfonic acids resulting from the acid treating of relatively low viscosity lubricating oils can be extracted from the acid-treated oil by adding a small amount of water, preferably after dilution of the oil with kerosene. However, the more desirable high molecular weight sulfonic acids (350-500), are those formed when treating petroleum distillates of greater than 125 S. S. U. at 100° F. viscosity with strong acid. In the practice of this invention the sulfonic acids present in the oil at this stage as a dilute solution may be converted to oil-soluble salts and precipitated as oil-insoluble sulfonate complexes and thus concentrated. The sulfonic acids are neutralized by reacting them with an alkaline material such as an alkali metal hydroxide or carbonate, alkaline earth metal hydroxide, carbonate, or salt or other polyvalent metal compound capable of neutralizing sulfonic acids. Since acid oils usually contain less than about 15% sulfonic acids, the neutralized oil will contain no more than about 15% of oil-soluble sulfonates, which is too low a concentration for practical purposes, and concentration is therefore necessary. The initial step in obtaining a concentrate of oil-soluble sulfonate in accordance with the present invention is to convert the oil-soluble sulfonate to an oil-insoluble form which is accomplished by contacting the oil solution of sulfonate with an aqueous solution of a compound capable of forming an oil-insoluble complex of the sulfonate, and heating the mixture to a temperature of 275–350° F., preferably 300° F., to drive off water and form the oil-insoluble complex. These complexes are believed to be of the so-called Werner type. Examples of water-soluble compounds which form oil-insoluble complexes with sulfonates are calcium propionate, barium acetate, barium propionate, lead acetate and tri-ethanol amine and similar alkylol amines. In general, about one chemical equivalent of the water-soluble compound is employed for each equivalent of sulfonate present. After the greater proportion of the water has been driven off, the complex precipitates, leaving a supernatant oil layer which can be decanted.

The oil-insoluble complex is then reconverted to an oil-soluble form in the presence of sufficient oil to dissolve the oil-soluble sulfonate and produce a concentrate of any desired practical concentration. The reconverted oil-soluble sulfonate can be obtained either in the form of the oil-soluble normal sulfonate or as an oil-soluble sulfonate complex. The normal sulfonate is formed by reacting the oil-insoluble complex with an aqueous acid, the salts of which do not form a sulfonate complex. In most cases, sulfuric acid of 10–50% strength is suitable. In this operation the precipitated complex as obtained after decanting the oil may be used or it may be diluted with an oil such as mineral lubricating oil in an amount to be determined by the desired amount of sulfonate in the finished concentrate. The reactant mixture is then agitated at a temperature below boiling until good dispersion of the two phases is obtained (usually less than 30 minutes) and the mixture is then heated to the neighborhood of 300° F. to remove both the water and the volatile acids liberated. The reaction product is then filtered by any convenient means to remove any insoluble inorganic salts formed, yielding as a filtrate an oil solution of normal sulfonate in concentrated form.

It is preferred however to convert the oil-insoluble sulfonate complex to a complex which is oil-soluble, materials of this type usually giving more fluid concentrates and being more effective engine oil additives than are the normal sulfonates. This is accomplished by reacting the oil-insoluble complex with a reagent, the salts of which form oil-soluble sulfonate complexes. The chlorides, for instance, of polyvalent metals such as calcium and barium, as well as of magnesium, copper, nickel, iron, zinc and aluminum form the desired oil-soluble sulfonate complexes. If the oil-insoluble complex contains one of these polyvalent metals as the cation the oil-soluble complex can be formed by reacting the insoluble complex with one equivalent weight of hydrochloric acid in the form of aqueous hydrochloric acid. If a metal the chloride of which is water insoluble (e. g. lead) is present, the reaction may be carried out with an equivalent weight of aqueous hydrochloric acid plus a suitable aqueous polyvalent metal salt. The reaction is carried out by adding the desired amount of liquid hydrocarbon such as mineral lubricating oil to the precipitated complex, incorporating the aqueous solution of hydrochloric acid and, if necessary, a chloride salt, heating to a temperature in the neighborhood of 300° F. to drive off the water and the acid radical of the precipitating complex, and filtering to remove inorganic salts. The filtrate is a clear solution of oil-soluble complex in oil.

An alternative procedure is to treat an acid-oil containing preferentially oil-soluble sulfonic acids in solution with a reagent capable of forming an oil-insoluble sulfonate complex at the temperature conditions previously described to precipitate the oil-insoluble complex and decanting the supernatant oil. The principal difference in the process employed when reacting with the sulfonic acids directly, over the method previously described for converting oil-soluble sulfonates to oil-insoluble sulfonate complexes is that two equivalents of reactant-forming insoluble sulfonate complexes must be used for each equivalent or combining weight of the sulfonic acid present in the oil. One equivalent of the precipitating agent is, of course, consumed in neutralizing the sulfonic acids. After the oil and precipitated complex are separated, the complex can then be regenerated in oil-soluble form by either of the methods previously described.

The following illustrative examples are given as instances of specific embodiments of the present invention.

*Example 1*

100 g. of a solution of 15% calcium sulfonate (900 mol. wt.) in oil was emulsified with 8 g. of lead acetate decahydrate dissolved in 40 cc. of water and the mixture was then dehydrated by heating to 300° F. The sulfonate precipitated as a resinous mass and 62.5 g. of clear oil was removed by decantation. The oil recovered represented 73.5% of the oil charged. A portion of the residue was diluted with 1½ times its weight of mineral lubricating oil. 11.5 cc. HCl of 10% concentration was then added and the mixture thoroughly agitated at a temperature of 200° F. until dispersion was complete. This was followed with 10 cc. of a 5% aqueous calcium chloride solution and the mixture heated to 300° F. to effect dehydration and then filtered. A clear solution of calcium sulfonate in oil, analyzing 0.63% calcium, 0.79% sulfur and 0.19% chlorine, was obtained.

*Example 2*

200 g. of the same 15% calcium sulfonate-oil solution as used in Example 1 was reacted with an aqueous solution of lead acetate containing 16 g. of lead acetate as described in Example 1. 59% of the oil originally present in the calcium sulfonate solution was recovered from the resinous precipitate. The residue was added to a weight of mineral lubricating oil equal to 22% of the weight of the residue and the mixture was converted to fluid calcium sulfonate by reaction with 5 g. calcium chloride as a 10% aqueous solution according to the conditions outlined in Example 1 for this reaction, and filtered. The product had the following inspections:

| | |
|---|---|
| Calcium _____percent__ | 1.61 |
| Sulfur _____do____ | 1.44 |
| Chlorine _____do____ | 1.15 |
| Neut. No. _____ | 0.43 |

*Example 3*

An acid-oil containing 10–12% sulfonic acids was reacted with one mol of barium acetate (as an aqueous solution) per mol of sulfonic acid, heated to 300° F. and stirred. An insoluble barium sulfonate-barium acetate complex settled out rapidly and 42% of the original oil charged was decanted. The precipitate was treated with sufficient aqueous hydrochloric acid to form barium chloride from the one-half mol of barium acetate not expended in neutralizing the sulfonic acid and the mixture dehydrated at 300° F. and filtered. A fluid concentrate of about 17–20% barium sulfonate-barium chloride complex was obtained. If dilute sulfuric acid had been used instead of dilute hydrochloric acid the product would have been an oil solution of normal barium sulfonate.

*Example 4*

The same acid-oil as described in Example 3 was reacted with two equivalents of lead acetate, yielding 78% of the original oil as a supernatant oil phase and a hard, resinous lead-sulfonate-lead acetate complex.

Although any liquid hydrocarbon might be used as the solvent in which to regenerate the oil-soluble sulfonate, it is preferred to use a refined mineral lubricating oil having a viscosity in the range of 35–150 S. U. S. at 210° F.

What is claimed is:

1. An improved method for producing concentrates of oil-soluble polyvalent metal sulfonates in liquid hydrocarbons which comprises contacting a petroleum oil solution of a material selected from the group consisting of preferentially oil-soluble sulfonic acids and metal salts thereof with an aqueous solution of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with a dilute aqueous solution selected from the group consisting of hydrochloric acid and sulfuric acid, the polyvalent metal salts of which do not form oil-insoluble sulfonate complexes, to reconvert the oil-insoluble sulfonate complex to an oil-soluble sulfonate or sulfonate complex, and heating to dehydrate and remove volatile acids.

2. An improved method for producing concentrates of oil-soluble polyvalent metal sulfonates in liquid hydrocarbons which comprises contacting a petroleum oil solution of a material selected from the group consisting of preferentially oil-soluble sulfonic acids and metal salts thereof with an aqueous solution of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with dilute aqueous hydrochloric acid to reconvert the oil-insoluble sulfonate complex to an oil-soluble sulfonate complex and heating to dehydrate and remove volatile acids.

3. An improved method for producing concentrates of oil-soluble polyvalent metal sulfonates in liquid hydrocarbons which comprises contacting a petroleum oil solution of preferentially oil-soluble sulfonic acids with an aqueous solution of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with a dilute aqueous solution selected from the group consisting of hydrochloric acid and sulfuric acid, the polyvalent metal salts of which do not form oil-insoluble sulfonate complexes, to reconvert the oil-insoluble sulfonate complex to an oil-soluble sulfonate or sulfonate complex, and heating to dehydrate and remove volatile acids.

4. An improved method for producing concentrates of oil-soluble polyvalent metal sulfonates in liquid hydrocarbons which comprises contacting a petroleum oil solution of preferentially oil-soluble sulfonic acids with an aqueous solution of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with dilute aqueous hydrochloric acid to reconvert the oil-insoluble sulfonate complex to an oil-soluble sulfonate complex and heating to dehydrate and remove volatile acids.

5. An improved method for producing concentrates of oil-soluble polyvalent metal sulfonates in liquid hydrocarbons which comprises contacting a petroleum oil solution of an oil-soluble metal sulfonate with an aqueous solution of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with a dilute aqueous solution selected from the group consisting of hydrochloric acid and sulfuric acid the polyvalent metal salts of which do not form oil-insoluble sulfonate complexes, to reconvert the oil-insoluble sulfonate complex to an oil-soluble sulfonate or sulfonate complex, and heating to dehydrate and remove volatile acids.

6. An improved method for producing concentrates of oil-soluble polyvalent metal sulfonates in liquid hydrocarbons which comprises contacting a petroleum oil solution of an oil-soluble metal sulfonate with an aqueous solution of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with dilute aqueous hydrochloric acid to reconvert the oil-insoluble sulfonate complex to an oil-soluble sulfonate complex and heating to dehydrate and remove volatile acids.

7. An improved method for producing concentrates in liquid hydrocarbons which comprises contacting a petroleum oil solution of an alkaline earth metal sulfonate with an aqueous solution of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with a dilute aqueous solution selected from the group consisting of hydrochloric acid and sulfuric acid, the polyvalent metal salts of which do not form oil-insoluble sulfonate complexes, to reconvert the oil-insoluble sulfonate complex to an oil-soluble sulfonate or sulfonate complex, and heating to dehydrate and remove volatile acids.

8. An improved method for producing concentrates in liquid hydrocarbons which comprises contacting a petroleum oil solution of an alkaline earth metal sulfonate with an aqueous solution of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with aqueous hydrochloric acid to reconvert the oil-insoluble sulfonate complex to an oil-soluble sulfonate complex and heating to dehydrate and remove volatile acids.

9. An improved method for producing concentrates of oil-soluble polyvalent metal sulfonates in liquid hydrocarbons which comprises contacting a petroleum oil solution of preferentially oil-soluble sulfonic acids with an aqueous solution containing two combining weights of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with aqueous hydrochloric acid to reconvert the oil-insoluble sulfonate complex to an oil-soluble sulfonate complex and heating to dehydrate and remove volatile acids.

10. An improved method for producing concentrates of oil-soluble metal sulfonates in liquid hydrocarbons which comprises contacting a petroleum oil solution of an oil-soluble alkaline earth metal sulfonate with an aqueous solution of an equivalent combining weight of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with aqueous hydrochloric acid to reconvert the oil-insoluble sulfonate complex to an oil-soluble sulfonate complex and heating to dehydrate and remove volatile acids.

11. An improved method for producing concentrates of oil-soluble metal sulfonates in liquid hydrocarbons which comprises contacting a petroleum oil solution of an oil-soluble alkaline earth metal sulfonate with an aqueous solution of an equivalent combining weight of a material selected from the group consisting of lead acetate, barium acetate, barium propionate and calcium propionate, heating the mixture to a temperature of 275–350° F. to effect dehydration of the mixture and precipitation of an oil-insoluble sulfonate complex; separating oil from the precipitated complex, reacting the separated complex with dilute aqueous hydrochloric acid and heating to a temperature sufficient to volatilize the organic acid liberated by the action of chlorine to reconvert the oil-insoluble sulfonate complex to an oil-soluble sulfonate complex.

12. An improved method for producing concentrates of oil-soluble barium sulfonate in lubricating oil which comprises contacting a petroleum oil solution of barium sulfonate with an aqueous solution of one combining weight of barium acetate, heating the mixture to 300° F. to effect dehydration of the mixture and precipitation of an oil-insoluble barium sulfonate complex, separating oil from the precipitated barium sulfonate complex and reacting the separated complex with an amount of aqueous hydrochloric acid equivalent in combining weight to the combining weight of barium acetate and heating to a temperature sufficient to dehydrate the mixture, volatilize acetic acid and reconvert the barium sulfonate complex to oil-soluble barium sulfonate complex.

GORDON W. DUNCAN.
JOHN C. ZIMMER.

REFERENCES CITED

The following references are of record in the file of this patent:

UNITED STATES PATENTS

| Number | Name | Date |
|---|---|---|
| 1,706,940 | Schestakoff | Mar. 26, 1929 |
| 1,958,630 | Limburg | May 15, 1939 |
| 2,395,713 | Barbour | Feb. 26, 1946 |
| 2,418,894 | McNab | Apr. 15, 1947 |